US009447883B2

(12) United States Patent
Von Bergen et al.

(10) Patent No.: US 9,447,883 B2
(45) Date of Patent: Sep. 20, 2016

(54) SEAL FOR SEALING SHAFTS

(75) Inventors: Ernst Peter Von Bergen, Ahlefeld (DE); Lars Ziemen, Hamburg (DE); Carlos Fangauf, Hamburg (DE); Dieter Von Borstel, Guderhandviertel (DE); Guido Wuestenhagen, Hamburg (DE); Ivan Ristic, Hamburg (DE)

(73) Assignee: Blohm + Voss Industries GmbH, Hamburg (DE)

( * ) Notice: Subject to any disclaimer, the term of this patent is extended or adjusted under 35 U.S.C. 154(b) by 0 days.

(21) Appl. No.: 13/982,532

(22) PCT Filed: Feb. 29, 2012

(86) PCT No.: PCT/DE2012/000228
§ 371 (c)(1),
(2), (4) Date: Jul. 30, 2013

(87) PCT Pub. No.: WO2012/139541
PCT Pub. Date: Oct. 18, 2012

(65) Prior Publication Data
US 2013/0307222 A1    Nov. 21, 2013

(30) Foreign Application Priority Data

Apr. 11, 2011 (DE) .................. 10 2011 018 584

(51) Int. Cl.
*F16J 15/32* (2016.01)
*B63H 23/32* (2006.01)

(52) U.S. Cl.
CPC ......... *F16J 15/3208* (2013.01); *F16J 15/3212* (2013.01); *F16J 15/3216* (2013.01); *F16J 15/3276* (2013.01); *B63H 2023/327* (2013.01)

(58) Field of Classification Search
CPC .. F16J 15/324; F16J 15/3232; F16J 15/3268; F16J 15/3224

USPC .................. 277/549, 550, 551, 561
See application file for complete search history.

(56) References Cited

U.S. PATENT DOCUMENTS 2,482,029 A   9/1949 Reynolds
2,760,802 A * 8/1956 Haley .................... F16J 5/3212
                                                                    277/561

(Continued)

FOREIGN PATENT DOCUMENTS

DE   37 42 080   6/1989
DE   41 41 999   6/1993

(Continued)

OTHER PUBLICATIONS

PCT Examiner Oscar Van Wel, International Search Report of the International Searching Authority for International Application PCT/DE2012/000228, mailed Sep. 7, 2012, 3 pages, European Patent Office, HV Rijswijk, Netherlands.

(Continued)

*Primary Examiner* — Kristina Fulton
*Assistant Examiner* — L. Susmitha Koneru
(74) *Attorney, Agent, or Firm* — W. F. Fasse

(57) ABSTRACT

A seal for sealing around a shaft includes a radially outer clamp-in element to be clamped into a housing, an intermediate membrane part extending radially inwardly (toward the shaft) at an angle from the clamp-in element, and an angled base part at a radially inner end of the intermediate membrane part. A spring is received in a receiving groove that forms a spring pocket in the base part, and the spring exerts a contact pressure of a seal lip of the base part against the shaft. In a pressureless state without a pressure differential across the seal, the spring pocket has a width larger than the sectional diameter of the spring and thus forms a free play space for the spring in the pocket.

18 Claims, 2 Drawing Sheets

(56) References Cited

U.S. PATENT DOCUMENTS

| | | | |
|---|---|---|---|
| 3,207,521 A | 9/1965 | Dega | |
| 3,210,086 A | 10/1965 | Hudson et al. | |
| 3,214,180 A | 10/1965 | Hudson et al. | |
| 3,773,336 A * | 11/1973 | Walter | B63H 23/26 277/551 |
| 3,788,100 A | 1/1974 | Pitner | |
| 3,902,726 A | 9/1975 | Hisada | |
| 3,920,250 A | 11/1975 | Eklund | |
| 3,968,971 A * | 7/1976 | Mariaulle | F16J 15/32 137/625.29 |
| 4,344,631 A | 8/1982 | Winn | |
| 4,383,691 A * | 5/1983 | Potter | F16J 15/3284 277/559 |
| 4,470,605 A | 9/1984 | Deuring | |
| 4,750,747 A | 6/1988 | Holzer | |
| 4,781,102 A | 11/1988 | Scerbo et al. | |
| 4,964,647 A | 10/1990 | Stephan | |
| 5,082,294 A | 1/1992 | Toth et al. | |
| 5,219,434 A | 6/1993 | Von Bergen et al. | |
| 5,269,539 A | 12/1993 | Martin | |
| 5,308,269 A | 5/1994 | von Bergen et al. | |
| 5,411,273 A * | 5/1995 | Pietsch | F16J 15/3216 277/309 |
| 5,643,026 A | 7/1997 | Pietsch et al. | |
| 5,820,132 A | 10/1998 | Marnot | |
| 5,845,910 A | 12/1998 | Sabo | |
| 6,241,396 B1 | 6/2001 | Shimomura et al. | |
| 6,264,205 B1 * | 7/2001 | Balsells | F16J 15/3216 277/551 |
| 6,367,811 B1 | 4/2002 | Hosokawa et al. | |
| 6,676,132 B1 * | 1/2004 | Takebayashi | F16J 15/002 277/549 |
| 6,979,002 B2 | 12/2005 | Ramsay | |
| 8,328,201 B2 * | 12/2012 | Epshetsky | F16J 15/3244 277/551 |
| 8,828,178 B2 | 9/2014 | Yamamoto et al. | |
| 2004/0090015 A1 * | 5/2004 | Weiss | F16J 15/3252 277/549 |
| 2004/0169339 A1 * | 9/2004 | Bock | F16J 15/3216 277/549 |
| 2005/0184468 A1 | 8/2005 | Aoshiba et al. | |
| 2006/0022414 A1 * | 2/2006 | Balsells | F16J 15/3268 277/572 |
| 2007/0222161 A1 | 9/2007 | Voydatch et al. | |
| 2007/0278748 A1 | 12/2007 | Matsui et al. | |
| 2007/0290451 A1 * | 12/2007 | Yager | F16J 15/3256 277/551 |
| 2009/0146379 A1 * | 6/2009 | Foster | F16J 15/3236 277/307 |
| 2010/0237566 A1 * | 9/2010 | Balsells | F16J 15/166 277/550 |
| 2012/0099986 A1 * | 4/2012 | Hisada | F01C 19/005 415/231 |
| 2012/0235361 A1 * | 9/2012 | Tadano | F16J 15/164 277/554 |
| 2013/0264777 A1 * | 10/2013 | Himeno | F16J 15/3208 277/549 |
| 2013/0300068 A1 | 11/2013 | Fangauf et al. | |
| 2013/0313786 A1 * | 11/2013 | Fangauf | F16J 15/3204 277/402 |

FOREIGN PATENT DOCUMENTS

| | | |
|---|---|---|
| DE | 196 52 001 | 6/1997 |
| DE | 37 14 674 | 11/1999 |
| DE | 699 29 489 | 9/2006 |
| DE | 102012006125 | 9/2013 |
| EP | 0 458 123 | 11/1991 |
| FR | 2 059 644 | 6/1971 |
| GB | 2 213 539 | 8/1989 |
| GB | 2 213 540 | 8/1989 |
| JP | 05-263947 A | 10/1993 |
| JP | 2010-203584 A | 9/2010 |
| WO | WO 2015/061810 | 4/2015 |

OTHER PUBLICATIONS

PCT Examiner Oscar Van Wel, English Translation of PCT Written Opinion of the International Searching Authority for International Application PCT/DE2012/000228, mailed Sep. 7, 2012, 7 pages, European Patent Office, HV Rijswijk, Netherlands.

Office Action in U.S. Appl. No. 13/983,112, mailed Oct. 10, 2013, 7 pages.

* cited by examiner

SEAL FOR SEALING SHAFTS

FIELD OF THE INVENTION

The invention relates to a seal for sealing shafts relative to liquid media, such as propeller shafts, impeller shafts, rudder shafts of ships, consisting of a clamp-in element in allocated housing-fixed support rings as an installation space with an adjoining intermediate part as a membrane and an angled element facing toward the shaft with formation of a seal lip for contact on the shaft, whereby a receiving groove or trough with a spring is arranged in the angled element above the seal lip.

BACKGROUND INFORMATION

Seals of this type are known in various different embodiments for use for ships. An embodiment according to the generic field is known according to the DE 41 41 999 C2. In this regard it has been found that the adaptability or fitting capability of the seal edge geometry and adjustment of the angled region does not exhibit optimal relationships or conditions under increased pressure loading.

SUMMARY OF THE INVENTION

It is an object of an embodiment of the invention to enable a good adjustment of the seal and therewith to improve the adjustment of the seal to the prevailing conditions or relationships.

The solution of this object is achieved according to an embodiment of the invention in which the receiving groove is embodied as a spring pocket with a free space for the spring in the pressureless or pressure-free condition.

Hereby it is possible to give the spring a free space for the adjustment of the seal.

In order to enable an improvement of a seal edge geometry under pressure loading, it is suggested that the membrane is adjustable by changing its tilt angle under pressure loading until reaching a limit pressure for contacting on an allocated housing wall, such as an extended support ring, and an enlarged bottom side in contact angle is adjustable in the angled region with the seal lip.

Hereby, relatively good relationships or conditions for forming contact surfaces with advantageous angle relationships at high pressing force are adjustable or settable by a change of the contact angle under pressure loading.

It is further suggested that the free space comprises an axially directed width of 5 to 30% of a spring diameter.

For securing the inserted spring it is suggested that an axially protruding or overhanging nose as a retaining element with an undercut or recess radially thereunder for receiving and retaining the inserted spring is arranged on the membrane above the spring pocket.

For forming an advantageous contact surface of the seal it is suggested that the seal lip for contacting on the shaft is formed by a rounded end region of the angled element.

Further it is suggested that at least the region of the seal lip is formed of a more wear resistant elastomer relative to the material of the further part of the seal.

BRIEF DESCRIPTION OF THE DRAWINGS

An example embodiment of the invention is schematically illustrated in the drawing. It is shown by.

DETAILED DESCRIPTION OF AN EXAMPLE EMBODIMENT OF THE INVENTION

Figure 1:
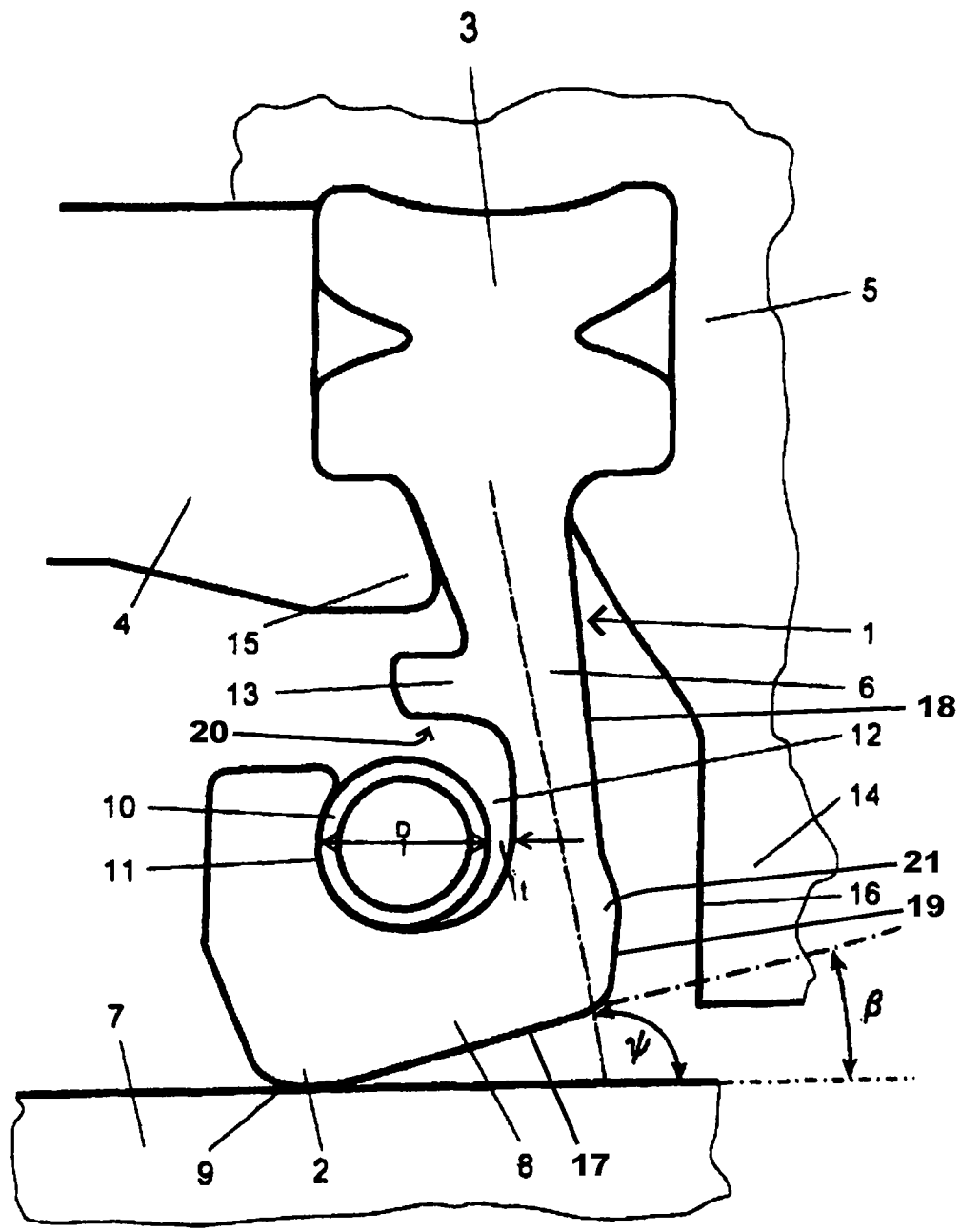
FIG. 1 a seal as allocated to a shaft at normal pressure.

The illustrated seal 1 is formed of a rubber elastic material, such as an elastomer, whereby at least the region of a seal lip 2 is formed of a more wear resistant elastomer than the material of the further part of the seal 1.

The seal 1 consists of an upper clamp-in element or mounting part 3, which is clamped into housing-fixed metallic support rings 4, 5 in a liquid-tight known manner. An intermediate part 6 as a membrane adjoins the clamp-in part 3 of the seal 1, and the intermediate part 6 is embodied at an angle psi as a tilt angle relative to a horizontal (shaft 7).

The intermediate part 6 extends radially inwardly toward the shaft 7 to a bottom side 17 of the seal 1 that faces toward the shaft 7, where the intermediate part 6 is further connected with an angled region or base part 8 of the seal 1 that extends from the intermediate part 6 axially forwardly and radially outwardly toward the shaft 7 that is to be sealed. With its end region 9, the base part 8 forms the seal lip 2, which lies in contact on the shaft 7 with a bottom side contact angle beta between the shaft 7 and the bottom side 17 of the seal 1. In this embodiment, the seal lip 2 is formed by a rounded end region 9 of the angled region or base part 8 of the seal 1.

For forming or developing a contact pressure of the seal lip 2 on the shaft 7, an allocated spring 10 is provided in addition to the elastic return element of the angled region 8 of the seal 1. In that regard, the spring 10 with a diameter D is received in a receiving groove or trough 11 as a spring pocket and thereby has a formed free space 12 with a free space depth or width t in the axial direction, which enables a flexible adjustment of the angled region 8 of the seal 1. For securing the spring 10, an axially protruding or overhanging nose 13 as a retaining element with an undercut 20 or recess radially thereunder is arranged on the intermediate part 6 of the membrane radially outwardly above the receiving groove 11 so that the spring 10 is retained radially inwardly under the nose 13 forming the undercut 20. The free space depth or width t preferably amounts to 15% of the spring diameter D.

Figure 2:
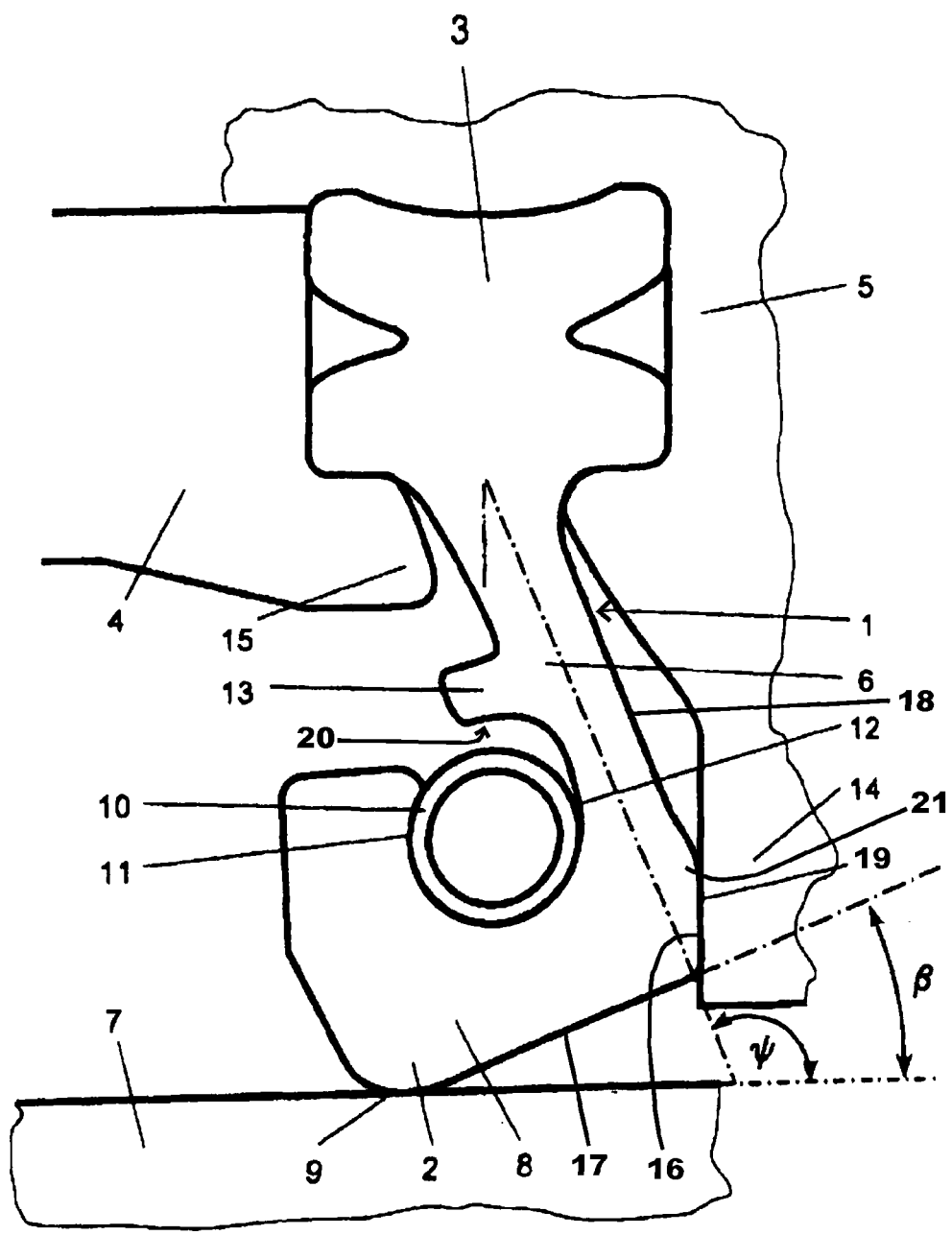
FIG. 2 an illustration like FIG. 1 at high pressure.

Through this arrangement it is possible to increase or enlarge the contact angle beta of the bottom side 17 in the axial direction of the seal lip 2 relative to the shaft 7 under pressure loading, and therewith to correspondingly flexibly adjust it, and to reduce a seal surface so that an advantageous contact width is established, as shown in the transition from FIG. 1 to FIG. 2.

For limiting the tilt angle psi of the seal 1 upon reaching a position as shown in FIG. 2 when the medium that is to be sealed reaches a provided maximum limit pressure, a wall 16 is arranged fixed on the housing to act as a stop and support for the seal 1. For this, the support ring 5 facing away from the medium to be sealed is extended or lengthened radially inwardly and has a part 14 providing the wall 16 that is extended radially toward and into the area of the shaft surface, while the support ring 4 allocated to the medium to be sealed ends with a projection or protrusion 15. More particularly for stopping and supporting the seal 1 in the maximum pressure position as shown in FIG. 2, the arrangement has the following structure as shown in FIGS. 1 and 2. A rear side of the intermediate membrane part 6 includes a first flat surface portion 18 extending at a first angle relative to the axis of the shaft 7. The first angle is an obtuse angle as measured from the rear side of the intermediate membrane part 6 to the shaft 7 in the pressureless condition shown in FIG. 1. The rear side of the intermediate membrane part 6 further includes a rearwardly protruding portion 21 that protrudes rearwardly from the first flat surface portion 18. The rearwardly protruding portion 21 includes a second flat surface portion 19 extending at a second angle relative to the axis of the shaft 7. The second angle is smaller than the obtuse first angle as measured from the rear side of the intermediate membrane part 6 to the shaft 7 in the pressureless condition. The second angle is especially an acute angle as measured from the rear side of the intermediate membrane part 6 to the shaft 7 in the pressureless condition in the embodiment as shown in FIG. 1. Furthermore, the first flat surface portion 18 and the second flat surface portion 19 do not contact the housing support ring 5 or its extended part 14 in the pressureless condition as shown in FIG. 1. However, in the maximum pressured condition with a maximum pressure differential across the seal ring as shown in FIG. 2, the first flat surface portion 18 does not contact the housing, but the second flat surface portion 19 flushly contacts and stops against a countersurface of the wall 16 of the housing.

The invention claimed is:

1. A seal apparatus for sealing a shaft relative to liquid media, comprising a housing, a seal ring and a spring,
wherein the seal ring comprises a clamp-in element clampingly held in allocated housing-fixed support rings of the housing, an adjoining intermediate part forming a seal membrane, and an angled element facing toward the shaft with formation of a seal lip for contact on the shaft, whereby a receiving groove that receives the spring therein is arranged in the angled element above the seal lip,
wherein the receiving groove is embodied as a spring pocket bounded between two side walls of the spring pocket, with a pocket height in a radial direction essentially equal to a spring diameter of the spring, with a first one of the side walls of the spring pocket having an undercut so that the spring can be retained radially inwardly under the undercut, and with a free space for the spring formed in the spring pocket in a pressureless condition of the seal apparatus,
wherein the free space is formed between a widest part of the spring and an adjacent one of the side walls in an axis-parallel direction parallel to an axis of the shaft,
wherein the seal membrane and the angled element are integral portions of a monolithic seal component integrally including the two side walls that bound the spring pocket therebetween in the axis-parallel direction,
wherein the seal membrane is flexible and is configured and arranged so that the seal membrane is pivotable forward and backward along the axis-parallel direction, and the seal membrane and the angled element are spaced forwardly away from and do not contact the housing in the pressureless condition, and
wherein the seal membrane is configured and arranged so that its tilt angle increases from the pressureless condition upon pressure loading up to reaching a limit pressure at which the membrane contacts on an allocated housing wall of an extended support ring of the housing, and upon the pressure loading an enlarged bottom side contact angle is established in the angled region with the seal lip.

2. The seal apparatus according to claim 1, characterized in that the free space comprises an axial width of 5 to 30% of a spring diameter of the spring.

3. The seal apparatus according to claim 1, characterized in that a protruding nose as a retaining element for retaining the spring in the spring pocket is provided on the seal membrane above the spring pocket and spaced away from the spring, wherein the undercut is formed under the protruding nose.

4. The seal apparatus according to claim 1, characterized in that the seal lip for contact on the shaft is formed by a rounded end region of the angled element.

5. The seal apparatus according to claim 1, characterized in that at least a region of the seal lip is formed of a more wear resistant elastomer relative to a material of another portion of the seal ring.

6. A seal arrangement for sealing around a shaft extending along an axis, wherein said seal arrangement comprises a housing, a seal ring and a spring that extend concentrically around the axis, and wherein:
said seal ring includes a radially outer mounting part that is mounted in the housing around the shaft, an intermediate membrane part extending radially inwardly from said mounting part, and a base part connected to and protruding axially forwardly from a front side of said intermediate membrane part at a radially inner end portion of said intermediate membrane part;
said base part includes a seal lip adapted to sealingly contact the shaft at a radially innermost portion of said base part;
said seal ring has a spring pocket formed at least partially as a groove in said base part radially outwardly from said seal lip;
said spring is received in said spring pocket;
said seal ring further includes a protruding nose that protrudes forwardly from said front side of said intermediate membrane part at a location radially outwardly from said spring pocket, wherein said protruding nose is spaced radially outwardly away from said spring by a radial spacing distance, so that said protruding nose retains said spring in said spring pocket if said spring moves radially outwardly through said radial spacing distance;
in a pressureless condition without a pressure differential across said seal ring, said spring pocket has an open width greater than a sectional diameter of said spring in an axis-parallel direction parallel to the axis in the pressureless condition, so that said spring is received in said spring pocket with a free space between said spring and at least one of two side walls that bound sides of said spring pocket at least up to a location of said sectional diameter to bound said spring in said spring pocket;
one of said side walls bounding said spring pocket is formed by said front side of said intermediate membrane part;
said intermediate membrane part and said base part are integral portions of a monolithic seal component of said seal ring integrally including said two side walls that bound said spring pocket therebetween; and
said intermediate membrane part is flexible and is configured and arranged so that said intermediate membrane part is pivotable forward and backward along the axis-parallel direction, and the intermediate membrane part and the base part are spaced forwardly away from and do not contact the housing in the pressureless condition.

7. The seal arrangement according to claim 6, wherein said free space measures from 5% to 30% of said sectional diameter of said spring.

8. The seal arrangement according to claim 6, wherein said free space measures 15% of said sectional diameter of said spring.

9. The seal arrangement according to claim 6, wherein said seal ring and said spring pocket are configured and arranged to be deformed and thereby said free space in said spring pocket transitions from being open in the pressureless condition to being closed in a pressured condition with a pressure differential across said seal ring.

10. The seal arrangement according to claim 6, wherein said seal lip has a rounded surface curvature for contacting the shaft.

11. The seal arrangement according to claim 6, wherein said seal ring comprises a first elastomer material forming said seal lip and a second elastomer material forming at least one of said parts other than said seal lip, and wherein said first elastomer material is more wear resistant than said second elastomer material.

12. The seal arrangement according to claim 6, wherein a rear side of said intermediate membrane part axially opposite said front side includes a first flat surface portion extending at a first angle relative to the axis, said first angle is an obtuse first angle as measured from said rear side in the pressureless condition, said rear side of said intermediate membrane part further includes a rearwardly protruding portion that protrudes rearwardly from said first flat surface portion, said rearwardly protruding portion includes a second flat surface portion extending at a second angle relative to the axis, and said second angle is smaller than said obtuse first angle as measured from said rear side in the pressureless condition.

13. The seal arrangement according to claim 12, wherein said second angle is an acute second angle as measured from said rear side in the pressureless condition.

14. The seal arrangement according to claim 12, wherein said first flat surface portion does not contact said housing and said second flat surface portion flushly contacts and stops against a countersurface of said housing in a maximum pressured condition with a maximum pressure differential across said seal ring.

15. The seal arrangement according to claim 6, wherein a tilt angle of said intermediate membrane part and a base angle of a base surface of said base part adjoining said seal lip, respectively relative to the axis, each respectively increase progressively from the pressureless condition to a maximum pressured condition with a maximum pressure differential across said seal ring.

16. The seal apparatus according to claim 1, wherein the first one of the side walls of the spring pocket is formed by a front side of the seal membrane.

17. A seal arrangement for sealing around a shaft extending along an axis, wherein said seal arrangement comprises a housing, a seal ring and a spring that extend concentrically around the axis, and wherein:
said seal ring includes a radially outer mounting part that is mounted in said housing around the shaft, an intermediate membrane part extending radially inwardly from said mounting part, and a base part connected to and protruding axially forwardly from a front side of said intermediate membrane part at a radially inner end portion of said intermediate membrane part;
said base part includes a seal lip adapted to sealingly contact the shaft at a radially innermost portion of said base part;
said seal ring has a spring pocket formed at least partially as a groove in said base part radially outwardly from said seal lip;
said spring is received in said spring pocket;
said seal ring further includes a protruding nose that protrudes forwardly from said front side of said intermediate membrane part at a location radially outwardly from said spring pocket, wherein said protruding nose is spaced radially outwardly away from said spring by a radial spacing distance, so that said protruding nose retains said spring in said spring pocket if said spring moves radially outwardly through said radial spacing distance;
in a pressureless condition without a pressure differential across said seal ring, said spring pocket has an open width greater than a sectional diameter of said spring in an axis-parallel direction parallel to the axis in the pressureless condition, so that said spring is received in said spring pocket with a free space between said spring and at least one of two side walls that bound sides of said spring pocket at least up to a location of said sectional diameter to bound said spring in said spring pocket;
one of said side walls bounding said spring pocket is formed by said front side of said intermediate membrane part;
said two side walls, said spring pocket therebetween, and said free space are each respectively annular and circumferentially continuous around said seal ring; and
said intermediate membrane part is flexible and is configured and arranged so that said intermediate membrane part is pivotable forward and backward along the axis-parallel direction, and said intermediate membrane part and said base part are spaced forwardly away from and do not contact said housing in the pressureless condition.

18. A seal apparatus for sealing a shaft relative to liquid media, comprising a housing, a seal ring and a spring,
wherein the seal ring comprises a clamp-in element clampingly held in allocated housing-fixed support rings of the housing, an adjoining intermediate part forming a seal membrane, and an angled element facing toward the shaft with formation of a seal lip for contact on the shaft, whereby a receiving groove that receives the spring therein is arranged in the angled element above the seal lip,
wherein the receiving groove is embodied as a spring pocket bounded between two side walls of the spring pocket, with a pocket height in a radial direction essentially equal to a spring diameter of the spring, with a first one of the side walls of the spring pocket having an undercut so that the spring can be retained radially inwardly under the undercut, and with a free space for the spring formed in the spring pocket in a pressureless condition of the seal apparatus,
wherein the free space is formed between a widest part of the spring and an adjacent one of the side walls in an axis-parallel direction parallel to an axis of the shaft,
wherein the seal membrane and the angled element are integral portions of a monolithic seal component integrally including the two side walls that bound the spring pocket therebetween in the axis-parallel direction,
wherein the seal membrane is flexible and is configured and arranged so that the seal membrane is pivotable forward and backward along the axis-parallel direction, and the seal membrane and the angled element are spaced forwardly away from and do not contact the housing in the pressureless condition, and
wherein a first portion of the seal membrane does not contact the housing and a second portion of the seal membrane contacts and stops against a countersurface of the housing in a maximum pressured condition with a maximum pressure differential across the seal ring.

* * * * *